United States Patent [19]

Choy

[11] Patent Number: 5,960,431
[45] Date of Patent: Sep. 28, 1999

[54] METHOD AND APPARATUS FOR ADDING DATA STORAGE BINS TO A STORED COMPUTER DATABASE WHILE MINIMIZING MOVEMENT OF DATA AND BALANCING DATA DISTRIBUTION

[75] Inventor: David Mun-Hien Choy, Los Altos, Calif.

[73] Assignee: International Business Machines Corporation, Armonk, N.Y.

[21] Appl. No.: 08/770,207

[22] Filed: Dec. 19, 1996

[51] Int. Cl.[6] ........................................ G06F 17/30
[52] U.S. Cl. .............................. 707/7; 707/200; 711/209; 711/202
[58] Field of Search .................... 707/1, 101, 7, 707/200, 2, 204, 205; 711/202, 209

[56] References Cited

U.S. PATENT DOCUMENTS

| | | | |
|---|---|---|---|
| 5,199,073 | 3/1993 | Scott | 380/49 |
| 5,218,696 | 6/1993 | Baird et al. | 395/600 |
| 5,287,499 | 2/1994 | Nemes | 395/600 |
| 5,440,734 | 8/1995 | Wagar | 395/600 |
| 5,490,258 | 2/1996 | Fenner | 395/401 |
| 5,511,190 | 4/1996 | Sharma et al. | 395/600 |
| 5,542,087 | 7/1996 | Neimat et al. | 395/600 |
| 5,542,089 | 7/1996 | Lindsay et al. | 395/600 |
| 5,548,769 | 8/1996 | Baum et al. | 395/800 |
| 5,613,105 | 3/1997 | Zbikowski et al. | 395/611 |
| 5,687,361 | 11/1997 | Sarkar | 395/601 |
| 5,692,177 | 11/1997 | Miller | 395/608 |
| 5,724,573 | 3/1998 | Agrawal et al. | 395/606 |
| 5,832,131 | 11/1998 | Choo et al. | 382/253 |

FOREIGN PATENT DOCUMENTS 7-160557   6/1995   Japan .

OTHER PUBLICATIONS

"Accessing Rows Based on Hidden Field Values", Research Disclosure, Nov. 1992, No. 343, Kenneth Mason Publications Ltd, England.

*Primary Examiner*—Paul V. Kulik
*Assistant Examiner*—Michael J. Wallace, Jr.
*Attorney, Agent, or Firm*—Gray Cary Ware Freidenrich

[57] ABSTRACT

In a database system that stores database objects in partitioned mode using bins to represent storage locations at which individual records of an object are stored, after they have been partitioned into logical buckets, a cascaded round-robin mapping method assigns buckets to bins evenly, while minimizing the movement of buckets when new bins are added and while minimizing memory overhead requirements. The method includes entering a do loop for an index counter variable j=m to 0 by −1, wherein "m" is the number of times new bins have been added since the last database reorganization. A variable y is set equal to x modulo $n_j$, wherein $n_j$ is the number of bins after the $j^{th}$ database expansion. If $y \geq n_{j-1}$, y is established to be the bin identification. Buckets are moved to populate new bins based on modulo n+k, wherein k is the number of bins added in the current expansion.

23 Claims, 3 Drawing Sheets

METHOD AND APPARATUS FOR ADDING DATA STORAGE BINS TO A STORED COMPUTER DATABASE WHILE MINIMIZING MOVEMENT OF DATA AND BALANCING DATA DISTRIBUTION

BACKGROUND OF THE INVENTION

1. Field of the Invention

The present invention relates generally to computer databases, and more particularly to methods and apparatus for balancing partitioned database contents by generating bucket-to-bin mappings and efficiently and effectively populating newly added data bins to existing databases.

2. Description of the Related Art

A computer database comprises a set of data organized into collections of interrelated structures, frequently referred to as "database objects". In a relational database, the data structures that embody data relations are typically rendered in set-oriented structures such as tables. A table in a relational database typically includes a number of records that correspond to rows of the table and that are related by attributes that correspond to columns of the table.

It happens that, to reduce the time required to search a database for a particular record, and to facilitate parallel processing (i.e., the association of multiple computers or multiple storage devices with a single database), it can be useful to store records of a table apart from each other. Such separate storage is referred to as "de-clustering" or "partitioning" the table. When de-clustering, it is advantageous to first map the records to logical "buckets", and then to map the buckets to physical storage locations referred to as "bins". Table records are typically distributed among buckets by means of a randomizing function that produces a Bucket Id (or Bucket identifier) for each record. The randomizing function might involve a transformation (hash) of the value of one or more data fields, otherwise called the partition key, of a respective record. Distribution of records to a number of storage locations also reduces the search domain for a record-access by its partition key. One bin usually has several buckets assigned to it. To further reduce the time required to search the database for data, the number of buckets per bin should be approximately equal, bin to bin.

Most databases, however, are not static. Instead, as a database expands, additional storage is acquired and new bins are frequently added. When new bins are added, existing buckets must be reassigned to the new bins to populate them, and a new mapping scheme must be generated that reflects the addition of the new bins, before the database can be reused. Buckets cannot be reassigned to bins haphazardly, however, because at the end of the reassignment it is important that each bin of the database has assigned to it about the same number of buckets as the other bins. The reason for this is that, as mentioned above, search time for data retrieval is reduced when the bins are evenly loaded. When the buckets are unevenly distributed among the bins, the database is said to be "skewed".

Accordingly, to ensure even loading of bins after new bins have been added to a database, the assignment of buckets to the bins typically is done in a round robin fashion. Unfortunately, this requires moving a large amount of the data between bins each time new bins are added, which is computationally intensive and time consuming, and which consequently prolongs the period during which the database cannot be used. Alternatively, buckets can be individually mapped to bins, which would both ensure even data distribution among the bins, and minimize the movement of data when new bins are added. Unfortunately, such individual mapping requires that a relatively large storage space be permanently allocated for a directory for each database table that lists the bin location of each bucket, thus undesirably increasing the memory overhead requirements of the database system.

As recognized herein, however, it is possible to reassign buckets to new bins in a database, without requiring the movement of large amounts of data, without resulting in database skew, and without requiring the maintenance of a large directory of database object mappings. Accordingly, it is an object of the present invention to provide a system for mapping buckets to an expandable collection of storage bins in a database. Another object of the present invention is to provide a system for adding new bins to a database, while ensuring even data distribution among the bins afterward. Still another object of the present invention is to provide a system for adding new bins to a database and generating a mapping thereof, while ensuring even data distribution among the bins afterward and while minimizing the amount of data movement necessary to populate the new bins with data. Yet another object of the present invention is to provide a system for adding, populating, and then mapping new bins which does not require excessive memory overhead. Another object of the present invention is to provide a system for adding new data storage bins to a database that is easy to use and cost effective.

SUMMARY OF THE INVENTION

My invention involves, in connection with the storage of data in a database system, the use of a programmed general purpose digital computer to determine bucket-to-bin data mappings and to populate new bins with logical data buckets in a cascaded round-robin operation. Stated differently, my invention involves a machine component in the form of a computer program product used in connection with storage of data in a database system for populating new bins with logical buckets that contain partitioned data tables, while minimizing data movement and memory overhead.

In my invention, correlations are mapped in a DMBS between data storage bins and data storage buckets. Each bin holds a plurality of buckets, and each bucket contains data records and has a bucket identification "x".

In accordance with a method embodying my invention, method steps are provided that include addition of new bins "m" times to database storage initially partitioned into $n_o$ bins, wherein "m" is a natural number. Then, an index counter variable "j" is initially defined to be equal to "m". The method steps also include defining a variable "y" to be the bucket identification "x" modulo $n_j$. Furthermore, the method steps include determining whether the variable "y" is at least equal to $n_{j-1}$, and if so, defining the variable "y" to be the bin identification of buckets having the bucket identification "x". Otherwise, the index counter variable "j" is decremented by an integer number, and the process is iteratively repeated. Subsequently, buckets are accessed using the variable "y" as the relevant bin identification.

Preferably, database storage contains "B" buckets distributed among a number of bins. Then, "k" new bins are added, and the method steps further include moving buckets to the new bins and mapping the buckets to the bins using the above steps. When the data records are clustered and efficiently accessible by bucket identification, the method steps further include, for each of the "n" existing bins, entering a do loop for an index counter variable "i"=0 to (B−1). Then, the method steps determine whether the $i^{th}$ bucket is in the bin, and if so, an index counter variable "j" is set to be the index counter variable "i" modulo the sum of "n" and "k". When the index counter variable "j" is at least as great as "n", the $i^{th}$ bucket is moved to the $j^{th}$ bin, and otherwise the $i^{th}$ bucket is not moved.

In contrast, when the data records are not clustered, or are not efficiently accessible by bucket identification, the method steps include, for each of the "n" existing bins and for each data record in the bin, defining an index counter variable "j" to be the bucket identification "x" associated with the data record modulo the sum of "n" and "k". Then it is determined whether the index counter variable "j" is at least as great as "n", and if so, the record is moved to the $j^{th}$ bin. Otherwise, the record is not moved.

As discussed in detail below, the present cascaded round-robin method generates a family of bucket-to-bin mappings, some of which can be expected to result in less database skew than others. Accordingly, the preferred method includes determining, when new bins have been added, whether the database skew of the new mapping exceeds a predetermined threshold, and if so, an alternate and more balanced mapping is constructed.

In another aspect, in a database storage partitioned into a plurality of buckets initially distributed in round robin fashion in $n_0$ bins, with each bucket being associated with a bucket identification "x", my invention involves a system for generating a bin identification "y" for the buckets when new bins have been added to the database, such that the number of bins after the new bin addition is $n_m$ bins. The system includes computer readable code means for entering a do loop for an index counter variable j=m to 0 by −1. Also, the system includes computer readable code means in the do loop for defining a variable y=x mod $n_j$, and computer readable code means for receiving y from the means for defining and determining whether $y \geq n_{j-1}$. Additionally, the system includes computer readable code means that are responsive to the means for determining for establishing y to be the bin identification when $y \geq n_{j-1}$ and then exiting the do loop, and otherwise continuing the do loop.

In still another aspect, my invention involves a computer-implemented method for populating "k" newly added bins in a database storage in which database objects are partitioned among "n" preexisting bins. The method includes determining whether to move a record based on the modulo of the sum of "n" and "k".

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figures 1, 2:
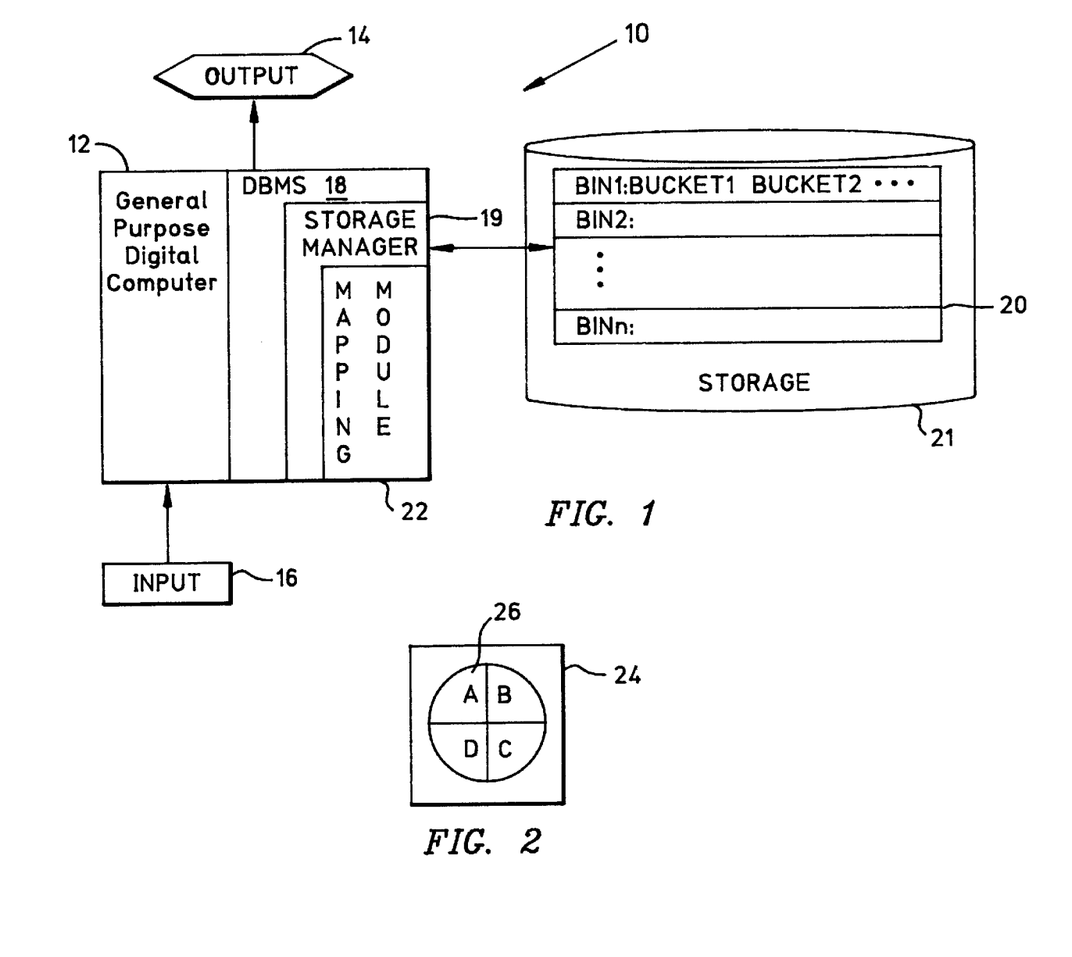
FIG. 1 is a block diagram of the system of the present invention for relocating records in a database.
FIG. 2 is a schematic view of a computer program storage device.

Referring initially to FIG. 1, a database system, generally designated 10, is shown for storage of a database by efficiently and evenly mapping buckets to bins when new bins are added. As shown, the database system 10 includes a programmed general purpose digital computer 12, preferably a mainframe computer, or RS6000/250 workstation computer made by the International Business Machines Corporation of Armonk, N.Y. An output device 14, such as a monitor, printer, computer network, or other output device, can be operatively connected to the computer. Likewise, an input device 16 can be connected to the computer 12. In accordance with principles well-known in the art, the input device 16 can be a keyboard, keypad, touch screen, mouse, joystick, voice transducer, or other appropriate data entry device.

As also shown in FIG. 1, the digital computer 12 can execute programs known to those skilled in the art including the functions of a database management system (DBMS) 18. The DBMS 18 includes a storage manager 19 that controls the transfer of database data between the DBMS 18 and a stored database 20. The stored database 20 typically resides on direct access media 21, such as a RAID array. In one embodiment, the DBMS 18 with the stored database 20 may be embodied as a DB2 database system available from the International Business Machines Corporation.

As shown in FIG. 1, the stored database 20 contains objects, such as tables, with records that are partitioned into logical buckets, with many buckets being assigned to each one of "n" bins, wherein "n" is a natural number. Each bin is a location in the storage where the database 20 is kept. The purpose of the present invention is to enable the addition of new bins (storage locations) to the storage locations where the stored database 20 is kept, and then to populate the new bins with a minimum of data movement in the stored database 20 and with a minimum of data skew, as discussed more fully below. To this end, the DBMS 18 includes the inventive mapping module 22 of the present invention. Preferably, the mapping module 22 is a component of the storage manager 19.

The storage manager 19 employs the mapping module 22 to generate bin identifications according to my invention. The storage manager includes means-described in more detail below—to reassign buckets among the bins for efficient and effective access to records in the stored database. Using bin identifications generated by the mapping module, the storage manager is able to determine storage locations for records requested by the DBMS 18, when given the bucket numbers to which the records are assigned. Conventionally, the storage manager 19 retrieves records from their bin locations and returns them to the DBMS 18.

Figure 3:
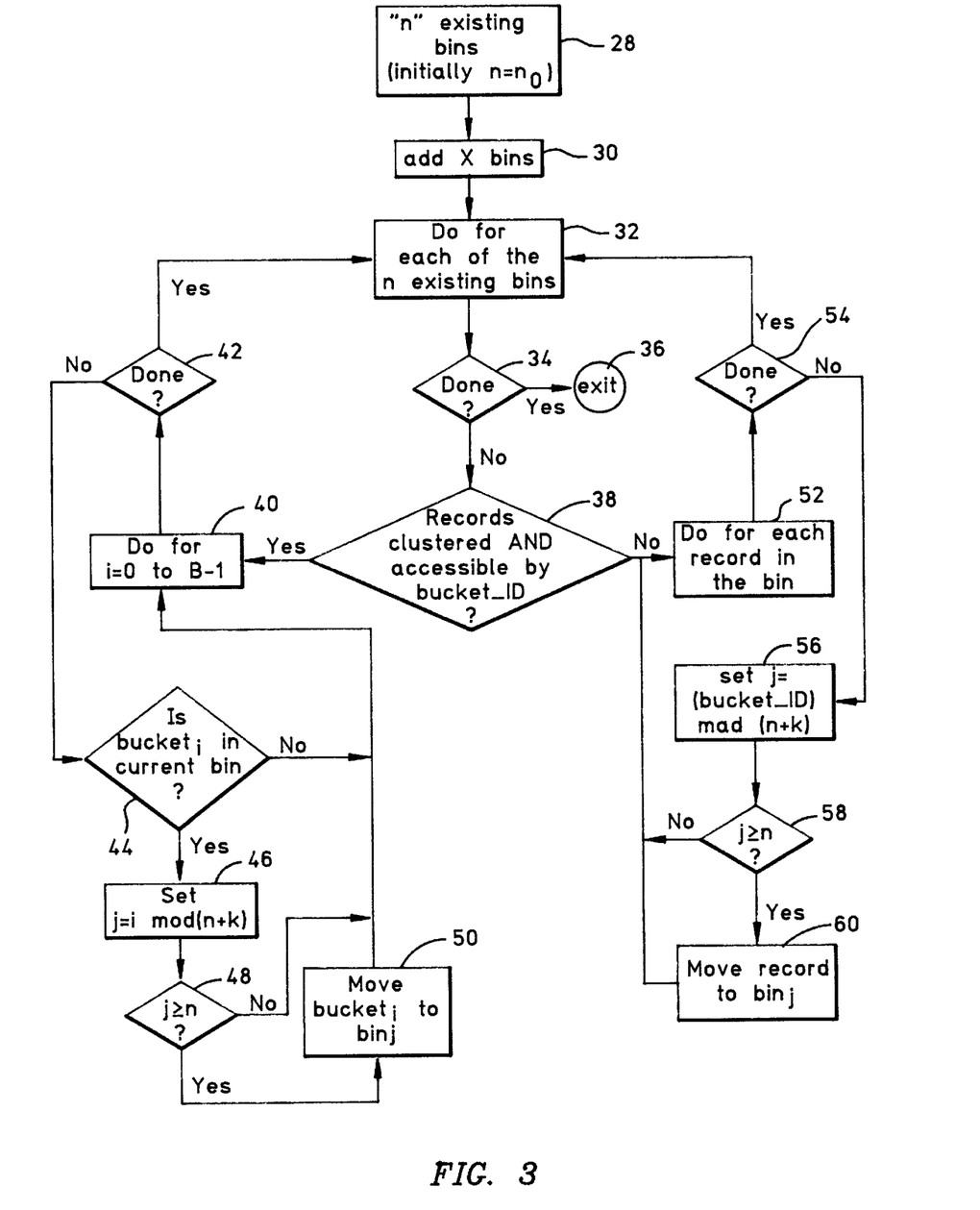
FIG. 3 is a flow chart showing the steps of the two alternate methods for moving records to new bins, shown in a single flow diagram for brevity of disclosure.
Figure 4:
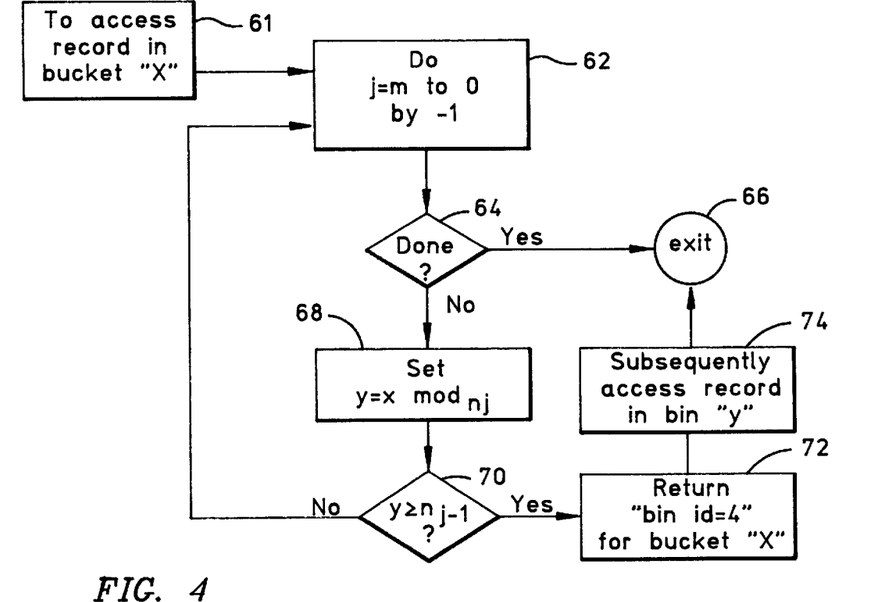
FIG. 4 is a flow chart of the bucket-to-bin mapping routine of the present invention.
Figure 5:
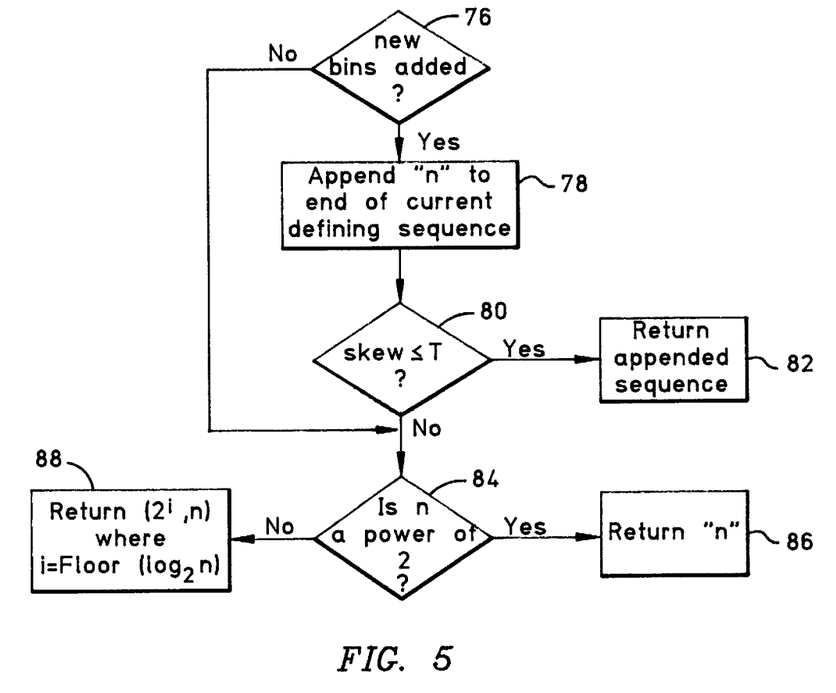
FIG. 5 is a flow chart showing the steps for selecting a defining sequence of integers that results in comparatively even bucket distribution among the bins.

FIGS. 3–5 and Tables I–IV illustrate the operations of the mapping module 22 of the present invention as embodied in computer program software. Those skilled in the art will appreciate that the Figures and Tables illustrate the structures of a computer program code including elements that function according to this invention. Manifestly, the invention is practiced in an essential embodiment by a machine component that renders the computer program code elements in a form that instructs a programmed general purpose digital computer to perform a sequence of function steps corresponding to those shown in the Figures.

These instructions may reside on computer-readable data s including a computer-readable data storage medium, such as a computer diskette 24 shown in FIG. 2. The machine component is shown in FIG. 2 as a combination of program code elements A–D in computer readable form that are embodied in a computer-usable data medium 26, on the computer diskette 24. Alternatively, such media can also be found in semiconductor devices, on magnetic tape, on optical disks, on a DASD array, on magnetic tape, on a conventional hard disk drive, on electronic read-only memory or on electronic ransom access memory, or other appropriate data storage device. In an illustrative embodiment of the invention, the computer-executable instructions may be lines of compiled C++ language code.

Now referring to FIG. 3, the means by which new bins are populated with data are shown. Generally, the bucket assignment method of the present invention, referred to herein as "Cascaded Round-Robin (CRR) Mapping". This method is disclosed below in reference to FIG. 3, which, in turn, defines the bucket to bin mapping shown and discussed in relation to FIG. 4 below, and is driven by a stored sequence of positive integers $n_0, n_1, \ldots, n_m$, where $m \geq 0$ and $n_i > n_{i-1} \geq 1$ for $i=1, \ldots, m$. In the above notation, $n_0$ is an initial number of bins after the stored database 20 is reorganized using a round-robin mapping at block 28 in FIG. 3, in which B buckets are assigned to $n_0$ bins and before new bins have been added at block 30. Also, $n_i$ is the total number of bins after the $i^{th}$ expansion, "m" represents (at most) the number of times new bins have been added since the round robin database reorganization at block 28 of FIG. 3, and $n_m$ is the current number of bins.

As will become clearer below, one of two population methods is selected, based on the data in the stored database. Commencing at block 28, buckets are initially allocated to bins using conventional round-robin assignment. Then, at block 30, "k" new bins are added to the stored database 21.

Block 32 shows that the present bucket assignment method contemplates a "do" loop for each of the "n" bins that exist in the database 18 before the bin addition operation undertaken at block 30. This "d" loop can be performed for each bin in parallel with the other bins, or sequentially, bin-by-bin.

Specifically, moving to decision diamond 34 the logic of the present invention determines whether the "do" loop has been completed, i.e., whether each bin has been processed as set forth below, and if the loop has been completed, the process exits at state 36. Otherwise, the logic proceeds to decision diamond 38.

It is to be understood that decision diamond 38 is provided for succinctness of disclosure, so that FIG. 3 can show both of the bucket-to-bin assignment methods of the present invention. Accordingly, at decision diamond 38 processing proceeds according to whether the records in the database 18 are clustered and are efficiently accessible by bucket identification (bucket_ID). If so, the logic proceeds to the left in FIG. 3, and otherwise it proceeds to the right. It is to be understood that the bucket_ID is produced by a suitable randomizing function performed conventionally by the storage manager 19.

Turning first to the logic on the left of FIG. 3, processing is conducted according to Table I.

TABLE 1

Record Relocation (if records are clustered and efficiently accessible by bucket id)

For each of the n existing bins Do (in parallel or in sequence)
    Do i = 0 to B − 1
        If bucket i is not in the current bin then iterate i
        j = i mod (n + k)
        if j ≧ n then move bucket i to bin j
    End
End In Table I, at block 40 the process undertakes a "do" loop for each bucket in the database 18 using an index variable "i", wherein "i" is incremented from 0 to B−1 by one, and wherein "B" is the number of logical buckets in the database 18. Moving to decision diamond 42, the logic of the present invention determines whether the "do" loop has been completed, i.e., whether each bucket has been processed as set forth below, and if the loop has been completed, the process loops back to block 32 to process the next bin.

Otherwise, the logic proceeds to decision diamond 44, wherein it is determined whether the bucket under test ("bucket$_i$") is in the current bin. If the bucket under test is in the current bin, the logic moves to block 46 to set a holder variable "j" equal to i mod(n+k). Recall that "k" represents the number of new bins added at block 30. Then, at decision diamond 48 it is determined whether the holder variable "j" is at least as great as the number of bins "n", and if it is, the bucket under test is moved to the $j^{th}$ bin, as indicated in FIG. 3 at block 50. From block 50, or from decision diamond 44 if the bucket under test was not in the current bin, or from decision diamond 48 if the holder variable "j" is less than the number of bins "n", the logic loops back to block 40.

It is to be understood that the test at decision diamond 48 is undertaken for "j" in its simplest form, but that alternatively the test comparison variable can be not "j" itself, but an indexed variable $c_j$, wherein "c" is a constant. The indexed variable $c_j$ should be greater than or equal to 0, and less than n+k, for the move at block 50 to be executed. Further, where "j" is used below in reference to FIG. 4, $c_j$ would be used.

If it is determined at decision diamond 38 either that the records of the database 18 are not clustered or that they are otherwise not efficiently accessible by bucket_ID, the logic proceeds right in FIG. 3 where Table II is used.

TABLE 2

Record Relocation (if records are not efficiently accessible or clustered by bucket id)

For each of the n existing bins Do (in parallel or in sequence)
    For each record in the bin Do
        j = Bucket_id mod (n + k)
        If j ≧ n then move record to bin j
    End
End In Table II, at block 52, the process undertakes a "do" loop for each record in the bin under test. Moving to decision diamond 54, the logic of the present invention determines whether the "do" loop has been completed, and if the loop has been completed, the process loops back to block 32 to retrieve the next bin.

Otherwise, the logic proceeds to block 56 to set a holder variable "j" equal to bucket_ID mod(n+k), wherein "bucket_ID" is the bucket identification of the record under test. Then, at decision diamond 58 it is determined whether the holder variable "j" is at least as great as the number of bins "n", and if it is, the record under test is moved to the $j^{th}$ bin, as indicated in FIG. 3 at block 60. From block 60, or from decision diamond 58 if the holder variable "j" is less than the number of bins "n", the logic loops back to block 52.

With the above disclosure in mind, turning now to FIG. 4 the mapping table (Table III) of the present invention is represented.

TABLE 3

Cascaded-Round-Robin Bucket Assignment (CRR bucket-to-bin mapping)

Do j = m to 0 by −1
   y = x mod $n_j$
   If y ≥ $n_{j-1}$ then Return y    /*$n_{-1}$ is considered 0 */
End Starting at block 61, a record in logical bucket "x" is to be accessed, or a record is to be stored into logical bucket "x". The logic enters a "do" loop at block 62 for an index variable "j", wherein "j" is decremented from m to 0 by one. Then, at decision diamond 64 it is determined whether the loop has been completed, and if it has the logic exits at state 66. Otherwise, the logic proceeds to block 68, wherein a holder variable "y" is set equal to x mod ($n_j$), with "x" representing the bucket_ID and $n_j$ representing the total number of bins after the $j^{th}$ expansion.

From block 68, the process moves to decision diamond 70. At decision diamond 70, it is determined whether the holder variable "y" is at least at great as $n_{j-1}$, and if it is, the logic moves to block 72 to return a signal indicating that the bin identification for the bucket "x" is equal to the holder variable "y". Then, at block 74 a record is subsequently accessed using the new mapping defined by the holder variable "y". From block 74, the logic moves to exit state 66. In contrast, if, at decision diamond 70, it is determined that the holder variable "y" is at not least at great as $n_{j-1}$, the logic loops back to block 62.

Accordingly, as recognized by the present invention described above, a single sequence of integers can be used for all partitioned database objects that share the same bucket-to-bin mapping. When new bins are added, a proportional fraction of the records are moved to populate the new bins using the appropriate one of the methods shown in FIG. 3, and the new total number of bins is added to the end of the integer sequence. Importantly, in this case no bucket redistribution is required among the old bins. The bucket assignment method shown in FIG. 4 is used to determine $bin_{13}$ ID although, with each new bin addition, it is driven by a different sequence of integers and thus, effectively produces a different mapping each time new bins are added.

In other words, the bucket-to-bin mapping of the present invention is completely defined by the integer sequence $n_0$, . . . , $n_m$. Conversely, any finite sequence of monotonic increasing positive integers defines a mapping for "n" bins, wherein "n" is the last integer in the sequence. Consequently, the present assignment method describes a family of mappings, i.e., for a given number of bins, there are many possible mappings, with each being defined by a respective integer sequence. As further recognized herein, the present invention can result in some database skew after many bin additions. For purposes of the present invention, the skew of a database is the difference between the size of its largest bin and the smallest integer that is greater than or equal to B/n (i.e., the so-called "CEILING" of B/n, discussed below).

FIG. 5 shows a method by which a mapping can be selected such that database skew is acceptably low. It is to be understood that the database can be reorganized using conventional round-robin techniques to reset m to 0, in the event that many bin additions result in unacceptable database skew. Essentially, FIG. 5 shows a method for determining an initial CRR mapping, as well as a new CCR mapping when new bins are added. This method is summarized as Table IV.

TABLE 4

Construction of a Cascaded-Round-Robin Bucket Mapping

If new bin(s) are added to an existing bucket mapping then Do
   Append n at the end of the existing defining sequence
   If the skew of the new mapping ≦ T then Return the appended sequence
End
If n is a power of 2 then Return n
Return $2^i$, n, where i = FLOOR($log_2$(n))   /* $2^i$ = the largest power-of-2 integer < n */

Starting at decision diamond 76, it is determined whether new bins have been added, and if so, the logic moves to block 78 to determine a CCR mapping in response to the addition of new bins. At block 78, "n" is appended to the current defining sequence, wherein "n" is the total number of bins after the addition. Proceeding to decision diamond 80, it is determined whether the skew of the database 18 is less than or equal to a predetermined skew "T". If it is, indicating acceptably low skew, the process returns the appended sequence at block 82, and no bucket relocation among the bins that existed before the bin addition is required.

On the other hand, if it is determined at decision diamond 80 that the skew is not acceptably low, the process moves to decision diamond 84, to determine whether "n" is a power of two (2). Also, as indicated in FIG. 5 if it is determined at decision diamond 76 that an initial mapping is to be undertaken, the process moves from there directly to decision diamond 84.

If it is determined that "n" is a power of two, then a defining single-integer sequence consisting of "n" itself is returned at block 86. Otherwise, the sequence ($2^i$, n) is returned at block 88, wherein "i" is the integer portion of the logarithm to the base 2 of n. In other words, i=FLOOR($log_2$n), wherein "FLOOR" is the largest integer that is less than or equal to the value, and "CEILING" is the smallest integer that is greater than or equal to the value. The present invention recognizes that not only is a short defining sequence relatively efficient and consuming of relatively little overhead, but such a short sequence has good "future impact" on the skew of the database 18 in the presence of future bin additions.

While the particular METHOD AND APPARATUS FOR ADDING DATA STORAGE BINS TO A STORED COMPUTER DATABASE WHILE MINIMIZING MOVEMENT OF DATA AND BALANCING DATA DISTRIBUTION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. In a database system having a stored database partitioned into a plurality of buckets initially distributed into storage in round robin fashion in $n_0$ bins and subsequently in $n_j$ bins after a $j^{th}$ time that new bins have been added to the stored database, each bucket being associated with a bucket identification "x", a database storage manager for generating a bin identification "y" for the buckets after the $m^{th}$ addition of new bins, comprising:

a mapping module that includes:
  first means for decrementing an index counter variable j=m to 0 by −1;
  second means for defining a variable y=x mod $n_j$;
  third means for determining whether y is equal to or greater than $n_{j-1}$; and
  fourth means responsive to the third means for establishing y as the bin identification when y is equal to or greater than $n_{j-1}$ and;
means for assigning the buckets to the $n_m$ bins; and
means for obtaining from storage records in the stored database using the bin identification.

2. The database storage manager of claim 1, wherein the stored database contains "B" buckets, an integer "k" is defined to be a number of new bins being added, and the data records are clustered and accessible by bucket identification, and the database storage manager further comprises:
  means for entering a do loop for a variable i=0 to B−1 to test each of the "n" existing bins;
  means for determining whether the $i^{th}$ bucket is in a bin being tested, and if not, retrieving the next i in the do loop;
  means for defining a variable j=*mode (n+k) when the $i^{th}$* bucket is in the bin being tested; and
  means for moving the $i^{th}$ bucket to the $j^{th}$ bin when j≧n and then retrieving the next i in the do loop, and otherwise retrieving the next i in the do loop.

3. The database storage manager of claim 2, wherein the data records are not clustered or are not accessible by bucket identification, and the database storage manager further comprises:
  means for defining j=x mod(n+k) to test each data record in each of the n existing bins, wherein "x" is the bucket identification for a record being tested; and
  means for moving a record to the $j^{th}$ bin when j≧n.

4. The database storage manager of claim 1, wherein the stored database includes "n" bins, wherein "n" is a natural number, the database contains "B" buckets and the buckets are assigned to the bins using a mapping characterized by a defining sequence of integers, and wherein the database storage manager further comprises:
  means for determining whether new bins have been added;
  means for appending an integer to the defining sequence when new bins have been added;
  means for determining a skew of the database and for returning the defining sequence with n appended thereto when the skew is less than a predetermined skew;
  means for determining, when the skew is larger than the predetermined skew, whether n is a power of two and if so, returning "n" as the new defining sequence; and
  means for returning, when n is not a power of two, the sequence of integers ($2^i$, n) as the new defining sequence, wherein i=floor($\log_2(n)$).

5. The database storage manager of claim 4, in combination with a digital computer.

6. A computer-implemented method for managing storage of a database, the storage being divided into a plurality of bins, the method comprising populating "k" newly added bins in the storage with records of the database partitioned among "n" preexisting bins, each record having a bucket identification signifying a bin of the plurality of bins, and moving a record to a newly added bin if the record's bucket identification modulo the sum of "n" and "k" signifies the newly added bin, wherein the records are clustered in the database storage and accessible by respective logical bucket identifications, and the method further comprises:
  for each of "n" existing bins, wherein "n" is a natural number, entering a do loop for an index counter variable "i"=0 to (B−1), wherein the database storage includes "B" buckets;
  determining whether the $i^{th}$ bucket is in the bin, and if so, setting an index counter variable "j" to be the index counter variable "i" modulo the sum of "n" and "k"; and
  when the index counter variable "j" is at least as great as "n", moving the $i^{th}$ bucket to the $j^{th}$ bin, and otherwise not moving the $i^{th}$ bucket.

7. A computer-implemented method for managing storage of a database the storage being divided into a plurality of bins, the method comprising populating "k" newly added bins in the storage with records of the database partitioned among "n" preexisting bins, each record having a bucket identification signifying a bin of the plurality of bins, and moving a record to a newly added bin if the record's bucket identification modulo the sum of "n" and "k" signifies the newly added bin, wherein the records are not clustered or are not accessible by bucket identification, and the method further comprises:
  for each of "n" existing bins, wherein "n" is a natural number, and for each record in the bin, defining an index counter variable "j" to be the bucket identification "x" associated with the record modulo the sum of "n" and "k";
  determining whether the index counter variable "j" is at least as great as "n", and if so, moving the record to the $j^{th}$ bin, and otherwise not moving the record to the $j^{th}$ bin.

8. A computer-implemented method for managing storage of a database, the storage being divided into a plurality of bins, the method comprising populating "k" newly added bins in the storage with records of the database partitioned among "n" preexisting bins, each record having a bucket identification signifying a bin of the plurality of bins, and moving a record to a newly added bin if the record's bucket identification modulo the sum of "n" and "k" signifies the newly added bin, wherein the database storage initially includes $n_0$ bins, further comprising the steps of:
  (a) adding new bins "m" times to the database storage, wherein "m" is a natural number, and then initially defining an index counter variable "j" to be equal to "m";
  (b) defining a variable "y" to be the bucket identification "x" modulo $n_j$;
  (c) determining whether the variable "y" is at least equal to $n_{j-1}$, and if so, defining the variable "y" to be the bin identification of the bucket having the bucket identification "x" and otherwise decrementing the index counter variable "j" by an integer number and repeating steps (b) and (c);
  (d) subsequently accessing buckets using the variable "y" as the relevant bin identification;
  (e) moving buckets to bins and mapping the buckets to the bins using steps (a)–(c).

9. The computer-implemented method of claim 8, wherein the database storage includes "n" bins, wherein "n" is a natural number, the database storage contains "B" buckets and the buckets are assigned to the bins using a mapping characterized by a defining sequence of integers, and wherein the method steps further comprise:

determining whether new bins have been added, and if so, appending "n" to the defining sequence;

determining whether the difference between the size of the largest bin and the ceiling of the quotient "B"/"n" exceeds a predetermined difference, and if not, returning the defining sequence with "n" appended thereto as a new defining sequence, and otherwise:

determining whether "n" is a power of two, and if so, returning "n" as the new defining sequence, and otherwise returning the sequence of integers ($2^i$, n) as the new defining sequence, wherein "i" equals the integer portion of the logarithm of "n".

10. The computer-implemented method of claim 9, wherein performed in a combination that includes a digital computer.

11. A computer program device comprising:

a computer program storage device readable by a digital computer; and a program means on the program storage device and including instructions executable by the digital computer for performing method steps for mapping to a bin in a database storage a data record bucket stored therein, the data record bucket containing data records of a database and having a bucket identification "x", while minimizing the movement of data when new bins are added to the database storage and while minimizing memory overhead, the method steps comprising:

(a) adding new bins "m" times to a database storage initially containing $n_0$ bins, wherein "m" is a natural number, and then initially defining an index counter variable "j" to be equal to "m";

(b) defining a variable "y" to be the bucket identification "x" modulo $n_j$;

(c) determining whether the variable "y" is at least equal to $n_{j-1}$, and if so, defining the variable "y" to be the bin identification of the bucket having the bucket identification "x" and otherwise decrementing the index counter variable "j" by an integer number and repeating steps (b) and (c); and (d) subsequently accessing the bucket using the variable "y" as the relevant bin identification.

12. The computer program device of claim 11, wherein the database contains "B" buckets, wherein an integer "k" is defined to be the number of new bins added in step (a), and wherein the method steps further comprise:

(e) moving buckets to bins and mapping the buckets to the bins using steps (a)–(c).

13. The computer program device of claim 12, wherein the data records are clustered and accessible by bucket identification, and the method step (e) further comprises the steps of:

(f) for each of the "n" existing bins, wherein "n" is a natural number, entering a do loop for an index counter variable "i"=0 to (B−1);

(g) determining whether the $i^{th}$ bucket is in the bin, and if so, setting an index counter variable "j" to be the index counter variable "i" modulo the sum of "n" and "k"; and (h) when the index counter variable "j" is at least as great as "n", moving the $i^{th}$ bucket to the $j^{th}$ bin, and otherwise not moving the $i^{th}$ bucket.

14. The computer program device of claim 12, wherein the data records are not clustered or are not accessible by bucket identification, and the method step (e) further comprises the steps of:

(f) for each of the "n" existing bins, wherein "n" is a natural number, and for each data record in the bin, defining an index counter variable "j" to be the bucket identification "x" associated with the data record modulo the sum of "n" and "k";

(g) determining whether the index counter variable "j" is at least as great as "n", and if so, moving the record to the $j^{th}$ bin, and otherwise not moving the record to the $j^{th}$ bin.

15. The computer program device of claim 11, wherein the database storage includes "n" bins, wherein "n" is a natural number, the database storage includes "B" buckets and the buckets are assigned to the bins using a mapping characterized by a defining sequence of integers, and wherein the method steps further comprise:

determining whether new bins have been added to the database storage, and if so, appending "n" to the defining sequence;

determining whether the difference between the size of the largest bin and the ceiling of the quotient "B"/"n" exceeds a predetermined difference, and if not, returning the defining sequence with "n" appended thereto as a new defining sequence, and otherwise:

determining whether "n" is a power of two, and if so, returning "n" as the new defining sequence, and otherwise returning the sequence of integers ($2^i$, n) as the new defining sequence, wherein "i" equals the integer portion of the logarithm of "n".

16. The computer program device of claim 15, wherein "i" equals the logarithm to the base (2) of "n".

17. The computer program device of claim 15, in combination with the digital computer.

18. In a computer database storage divided into a plurality of bins, in which buckets map data to bins, a computer-implemented bucket-to-bin mapping method characterized by a sequence of numbers, wherein the sequence is smaller in size than a stored directory having a bin identification or location for every bucket in the database, the method including:

adding new bins to the plurality of bins;

maintaining an even distribution of buckets to bins after each new bin addition, without requiring movement of data between bins other than populating new bins and without storing the bin identification or location for every bucket; and, populating "k" newly added bins in the database storage with records of the database partitioned among "n" preexisting bins, each record having a bucket identification signifying a bin, and moving a record to a newly added bin if the record's bucket identification modulo the sum of "n" and "k" signifies the newly added bin;

wherein the records are clustered in the database storage and accessible by respective logical bucket identifications, and the method further comprises:

for each of "n" existing bins, wherein "n" is a natural number, entering a do loop for an index counter variable "i"=0 to (B−1), wherein the database storage includes "B" buckets;

determining whether the $i^{th}$ bucket is in the bin, and if so, setting an index counter variable "j" to be the index counter variable "i" modulo the sum of "n" and "k"; and when the index counter variable "j" is at least as great as "n", moving the $i^{th}$ bucket to the $j^{th}$ bin, and otherwise not moving the $i^{th}$ bucket.

19. In a computer database storage divided into a plurality of bins, in which buckets map data to bins, a computer-implemented bucket-to-bin mapping method characterized by a sequence of numbers, wherein the sequence is smaller in size than a stored directory having a bin identification or location for every bucket in the database, the method including:

adding new bins to the plurality of bins;

maintaining an even distribution of buckets to bins after each new bin addition, without requiring movement of data between bins other than populating new bins and without storing the bin identification or location for every bucket; and, populating "k" newly added bins in the database storage with records of the database partitioned among "n" preexisting bins, each record having a bucket identification signifying a bin, and moving a record to a newly added bin if the record's bucket identification modulo the sum of "n" and "k" signifies the newly added bin;

wherein the records are not clustered or are not accessible by bucket identification, and the method further comprises:

for each of "n" existing bins, wherein "n" is a natural number, and for each record in the bin, defining an index counter variable "j" to be the bucket identification "x" associated with the record modulo the sum of "n" and "k";

determining whether the index counter variable "j" is at least as great as "n", and if so, moving the record to the $j^{th}$ bin, and otherwise not moving the record to the $j^{th}$ bin.

20. In a computer database storage divided into a plurality of bins, in which buckets map data to bins, a computer-implemented bucket-to-bin mapping method characterized by a sequence of numbers, wherein the sequence is smaller in size than a stored directory having a bin identification or location for every bucket in the database, the method including:

adding new bins to the plurality of bins;

maintaining an even distribution of buckets to bins after each new bin addition, without requiring movement of data between bins other than populating new bins and without storing the bin identification or location for every bucket; and, populating "k" newly added bins in the database storage with records of the database partitioned among "n" preexisting bins, each record having a bucket identification signifying a bin, and moving a record to a newly added bin if the record's bucket identification modulo the sum of "n" and "k" signifies the newly added bin;

wherein the database storage initially includes $n_0$ bins, and the method further comprises:

(a) adding new bins "m" times to the database storage, wherein "m" is a natural number, and then initially defining an index counter variable "j" to be equal to "m";

(b) defining a variable "y" to be the bucket identification "x" modulo $n_j$;

(c) determining whether the variable "y" is at least equal to $n_{j-1}$, and if so, defining the variable "y" to be the bin identification of the bucket having the bucket identification "x" and otherwise decrementing the index counter variable "j" by an integer number and repeating steps (b) and (c);

(d) subsequently accessing buckets using the variable "y" as the relevant bin identification;

(e) moving buckets to bins and mapping the buckets to the bins using steps (a)–(c).

21. The computer-implemented method of claim 20, wherein the database storage includes "n" bins, wherein "n" is a natural number, the database storage contains "B" buckets and the buckets are assigned to the bins using a mapping characterized by a defining sequence of integers, and wherein the method steps further comprise:

determining whether new bins have been added, and if so, appending "n" to the defining sequence;

determining whether the difference between the size of the largest bin and the ceiling of the quotient "B"/"n" exceeds a predetermined difference, and if not, returning the defining sequence with "n" appended thereto as a new defining sequence, and otherwise:

determining whether "n" is a power of two, and if so, returning "n" as the new defining sequence, and otherwise returning the sequence of integers ($2^i$, n) as the new defining sequence, wherein "i" equals the integer portion of the logarithm of "n".

22. The computer-implemented method of claim 21, performed in a combination that includes the database storage.

23. The computer-implemented method of claim 22, wherein the combination includes a digital computer.

* * * * *